April 29, 1952     C. B. DOUGLAS     2,594,543
ADJUSTABLE PLUMBER'S LEVEL
Filed Aug. 6, 1949
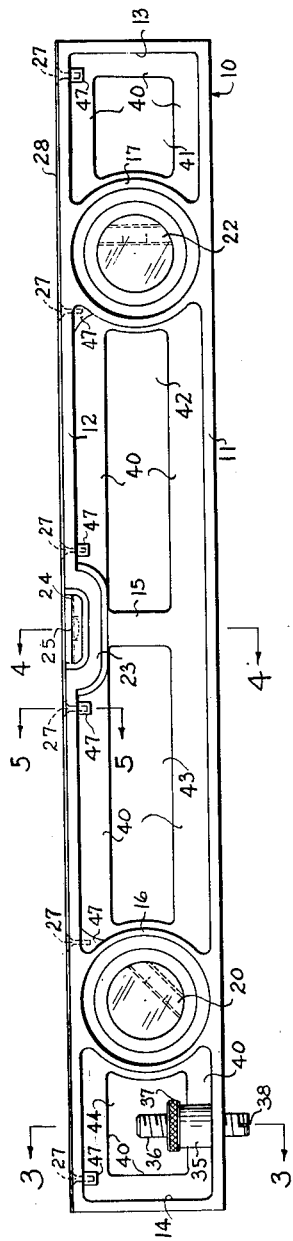
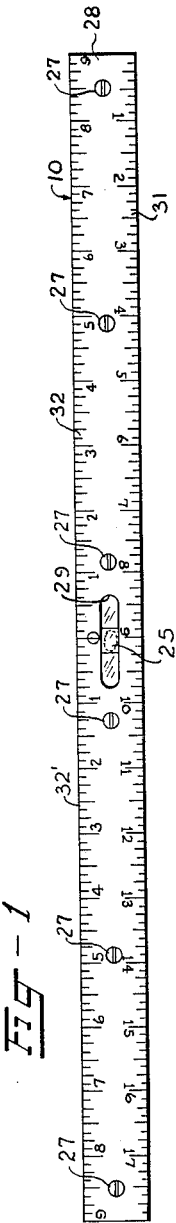
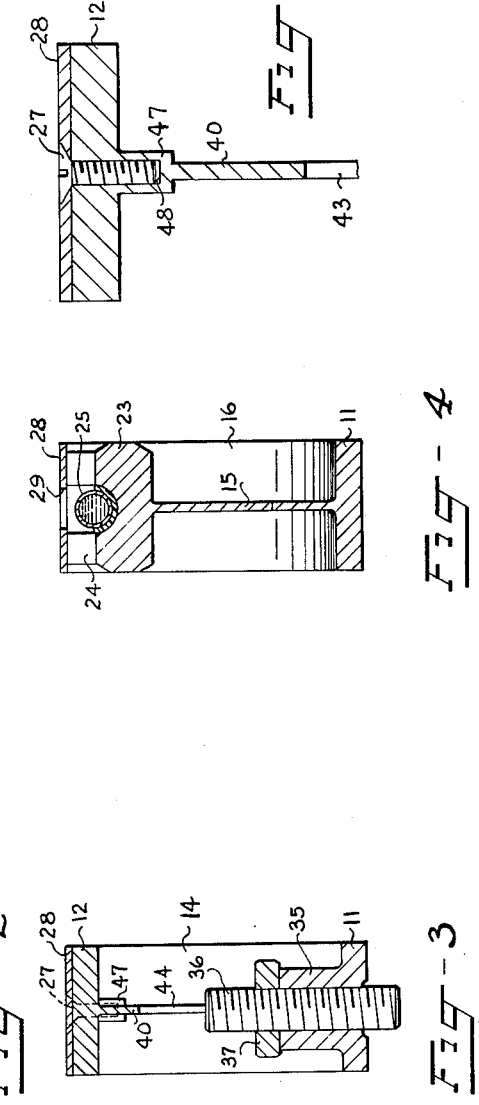
CHARLES B. DOUGLAS,
INVENTOR.
BY
ATTORNEY Patented Apr. 29, 1952

2,594,543

UNITED STATES PATENT OFFICE 2,594,543

ADJUSTABLE PLUMBER'S LEVEL

Charles B. Douglas, Charlotte, N. C.

Application August 6, 1949, Serial No. 108,910

1 Claim. (Cl. 33—213)

This invention relates to an improved level and more especially to a level especially adapted for use by plumbers. Heretofore levels of this type have been provided with a horizontal level and a vertical level and a forty-five degree level associated therewith and having a graduated rule associated with one edge thereof, and a plumber in laying out his work, such as for example, where he wants to place the two side brackets for supporting a lavatory, first centers where the lavatory will be, and from an ordinary level he measures off, say, five inches in each direction to where the brackets will be, but in this way he has to go through a mental calculation because, if the level is 18 inches long and he has the level on the 12 inch mark for the center, it is necessary for him to calculate back to 7 in one direction and up to 17 in the other direction in order to get the two bracket holes five inches from the center. Of course, before doing this, he would hold the level in vertical position to draw a center line on the wall and then would turn the level horizontally to figure off the distances from each side of the center line for the brackets for supporting the lavatory, and also at another point would measure off the distances to the center line for the hot and cold water supply pipes which run through the wall and are extended up to the lavatory.

Also in case of laying out a drain line with a certain slope or grade, it has been difficult to determine this. By providing a set screw in one end of the level it is easy to lay out the slope or grade of the drain pipe by elevating one end of the level a predetermined amount.

It is therefore an object of this invention to provide a level having a graduated ruler thereon with a zero in the center thereof and progressing in both directions inch by inch toward the ends of the level.

It is another object of this invention to provide a plumber's level whereby there can be drawn a vertical line on a wall or a horizontal line on a floor or ceiling for installing any desired fixture and then the level can be placed in a horizontal position with the central portion of the level having a zero graduation thereon disposed over the vertical line and the operator can measure laterally to whatever position he desires to place other fixtures and also providing means whereby one end of the level can be raised a predetermined amount to determine the grade or slope of a drain pipe and the like, and in fact, any kind of pipe to which a predetermined amount of fall is desired.

For example, if the plumber wants to lay a drain line with a fall of one-eighth of an inch to a foot and in the present embodiment he would have an 18 inch level, then he would move the set screw to raise one end of the level three sixteenths of an inch to lay out his line which would give him a draining of one inch to each eight feet.

Some of the objects of the invention having been stated, other objects will appear as the description proceeds, when taken in connection with the accompanying drawings, in which Figure 1 is an elevation of the improved level;

Figure 2 is a top plan view of Figure 1;

Figure 3 is a vertical sectional view taken along the line 3—3 in Figure 1;

Figure 4 is a vertical sectional view taken along the line 4—4 in Figure 1;

Figure 5 is a vertical sectional view taken substantially along the line 5—5 in Figure 1.

Referring more specifically to the drawings, the numeral 10 broadly designates a level having a base rib 11 and a top rib 12 and end ribs 13 and 14 with an intermediate rib 15 and a pair of enlarged ribs 16 and 17.

The rib 16 has a circular opening therein in which is mounted a conventional forty-five degree level 20 while the rib 17 has a similar opening therein in which is mounted a conventional vertical level 22. The upper rib 12 has a downwardly projecting portion 23 provided with an opening 24 on each side thereof through which a horizontal level 25 can be observed. The top rib 12 has secured thereto by any suitable means such as screws 27 a graduated sheet metal member 28 having an opening 29 therein through which the level 25 can be observed as well as through the openings 24. The sheet metal strip 28 has a conventional graduation indicated at 31 along one edge thereof and a special graduation along the other edge thereof which is indicated at 32 and 32', said graduations 32 and 32' commencing at zero in the center of the level and extending laterally away from the zero marking in the center of the strip 28.

Near one end of the rule is provided an enlarged portion 35 which is interiorly threaded for the reception of a screw 36 which has a lock nut 37 threadably secured thereon and the lower end of the screw has a screw driver slot 38 for purposes of adjusting the screw 36 relative to the portion 35. The screw 36 can be adjusted vertically to determine the slope of the level to thereby determine the slope per foot of any pipe or other object being installed.

The bottom and top portions 11 and 12 and end portions 13 and 14 have inwardly projecting thinned rib portions 40 integral therewith, and at the junction point of the upper rib portion 40 with the rib portion 12 there are provided enlarged portions 47 in order to make sufficient stock for the bores 48 in which the screws 27 are mounted.

In order to lighten the weight of the level and to permit ease of operation, the level has a plurality of openings 41, 42, 43 and 44 therethrough.

In the drawings and specification there has been set forth a preferred embodiment of the invention, and although specific terms are employed, they are used in a generic and descriptive sense only, and not for purposes of limitation, the scope of the invention being defined in the claim.

I claim:

In a plumber's level having an elongated one-piece rectangular frame having top, bottom and end portions which are T-shaped in cross-section and having webs spaced from each of its end portions and joining the top and bottom portions, the combination of the bottom portion having an enlargement therein provided with a threaded bore whose axis is at right angles to the longitudinal axis of the frame, an adjusting screw threadably mounted in said bore, said screw having a screw driver slot in its lower end and having a lock nut threadably mounted on the screw immediately above said enlargement.

CHARLES B. DOUGLAS.

REFERENCES CITED

The following references are of record in the file of this patent:

UNITED STATES PATENTS

| Number | Name | Date |
|---|---|---|
| 239,691 | Appleton | Apr. 15, 1881 |
| 591,139 | Morton | Oct. 5, 1897 |
| 621,358 | Merrill | Mar. 21, 1899 |
| 662,991 | Van Luvan | Dec. 4, 1900 |
| 1,126,548 | Mayes | Jan. 26, 1915 |
| 1,187,548 | Purer | June 20, 1916 |
| 1,210,370 | Dvorak | Dec. 26, 1916 |
| 1,221,644 | Woods | Apr. 3, 1917 |
| 1,683,065 | Carpenter | Sept. 4, 1928 |
| 2,162,602 | Black | June 13, 1939 |
| 2,521,525 | Krausser | Sept. 5, 1950 |
| 2,536,788 | Vaida | Jan. 2, 1951 |